United States Patent
Jensen et al.

(10) Patent No.: US 10,939,486 B2
(45) Date of Patent: Mar. 2, 2021

(54) LOCATION SOURCE CONTROL

(71) Applicant: Apple Inc., Cupertino, CA (US)

(72) Inventors: Bradley Joel Jensen, San Francisco, CA (US); Glenn Donald MacGougan, San Jose, CA (US); Kumar Gaurav Chhokra, San Jose (CA); Robert Mayor, Half Moon Bay, CA (US); Ronald K. Huang, San Jose, CA (US); Stephen J. Rhee, San Jose, CA (US)

(73) Assignee: Apple inc., Cupertino, CA (US)

( * ) Notice: Subject to any disclaimer, the term of this patent is extended or adjusted under 35 U.S.C. 154(b) by 161 days.

(21) Appl. No.: 15/275,236

(22) Filed: Sep. 23, 2016

(65) Prior Publication Data
US 2017/0359694 A1    Dec. 14, 2017

Related U.S. Application Data

(60) Provisional application No. 62/348,794, filed on Jun. 10, 2016.

(51) Int. Cl.
| H04W 76/14 | (2018.01) |
| H04W 4/029 | (2018.01) |
| H04W 4/80  | (2018.01) |

(52) U.S. Cl.
CPC .......... *H04W 76/14* (2018.02); *H04W 4/029* (2018.02); *H04W 4/80* (2018.02)

(58) Field of Classification Search
CPC combination set(s) only.
See application file for complete search history.

(56) References Cited

U.S. PATENT DOCUMENTS

| 6,535,815 B2 | 3/2003  | Bloebaum et al. |
| 7,277,049 B2 | 10/2007 | Korneluk et al. |
| 8,483,705 B1 | 7/2013  | Cope et al.     |

(Continued)

FOREIGN PATENT DOCUMENTS

| CN | 103702414 | 4/2014 |
| EP | 2270534   | 1/2011 |

(Continued)

OTHER PUBLICATIONS

U.S. Appl. No. 14/692,654, Opportunistic Offloading of Tasks Between Nearby Computing Devices, filed Apr. 21, 2015, of 46 pages.

(Continued)

*Primary Examiner* — Steven S Kelley
(74) *Attorney, Agent, or Firm* — Jaffery Watson Mendonsa & Hamilton LLP (57) ABSTRACT

Techniques for location source control for paired devices are described. Location source control selects a location source for a mobile device. The mobile device can receive, from an application program, a request for determining a location of the mobile device. The mobile device can determine a first location estimate using a location subsystem of the mobile device. The mobile device can determine whether to provide the first location estimate as input to the application program, or to provide a second location estimate as input to the application program. The second location estimate can be an estimated location of the companion device and determined by the companion device.

26 Claims, 7 Drawing Sheets

(56) References Cited

U.S. PATENT DOCUMENTS

| | | |
|---|---|---|
| 8,787,944 B2 | 7/2014 | Smith |
| 8,942,676 B2 | 1/2015 | Dalton et al. |
| 8,948,786 B2 | 2/2015 | Gillett |
| 9,107,040 B2 | 8/2015 | Rottier et al. |
| 9,232,354 B2 | 1/2016 | Smith et al. |
| 9,282,516 B2 | 3/2016 | Sen et al. |
| 9,301,082 B2 | 3/2016 | Meyers et al. |
| 9,432,961 B2 | 8/2016 | Rao et al. |
| 2002/0019698 A1 | 2/2002 | Vilppula et al. |
| 2003/0220116 A1 | 11/2003 | Sagefalk et al. |
| 2004/0192335 A1 | 9/2004 | Wong et al. |
| 2006/0121913 A1 | 6/2006 | Lin et al. |
| 2009/0281724 A1 | 11/2009 | Blumenberg et al. |
| 2010/0324813 A1 | 12/2010 | Sundararajan et al. |
| 2011/0039623 A1 | 2/2011 | Levenson et al. |
| 2011/0084803 A1 | 4/2011 | Niemela et al. |
| 2011/0165892 A1 | 7/2011 | Ristich et al. |
| 2011/0300875 A1* | 12/2011 | Kim ................. G01S 19/16 455/456.1 |
| 2012/0286997 A1 | 11/2012 | Lin et al. |
| 2013/0030931 A1 | 1/2013 | Moshfeghi |
| 2013/0109371 A1 | 5/2013 | Brogan et al. |
| 2014/0045463 A1 | 2/2014 | Hsieh et al. |
| 2014/0094195 A1 | 4/2014 | Luo et al. |
| 2014/0200038 A1 | 7/2014 | Rao et al. |
| 2014/0256346 A1 | 9/2014 | Venkatraman et al. |
| 2014/0274108 A1 | 9/2014 | Venkatraman et al. |
| 2014/0342755 A1 | 11/2014 | Youssef et al. |
| 2014/0343843 A1 | 11/2014 | Yanku |
| 2014/0357198 A1 | 12/2014 | Ye et al. |
| 2014/0358434 A1 | 12/2014 | Zhang et al. |
| 2014/0359078 A1 | 12/2014 | Liu et al. |
| 2015/0134249 A1 | 5/2015 | Yen |
| 2015/0172858 A1 | 6/2015 | Choi et al. |
| 2015/0186613 A1 | 7/2015 | Park et al. |
| 2015/0327009 A1* | 11/2015 | Vilppula ............. G01S 5/0257 455/457 |
| 2015/0358778 A1 | 12/2015 | Heo et al. |
| 2015/0381606 A1 | 12/2015 | Srivastav et al. |
| 2016/0050531 A1* | 2/2016 | Choi .................. H04W 4/023 455/456.2 |
| 2016/0065650 A1 | 3/2016 | Pahwa et al. |
| 2016/0066147 A1* | 3/2016 | Venkatraman ........ H04W 4/023 455/456.2 |
| 2016/0066149 A1 | 3/2016 | Pahwa et al. |
| 2016/0198322 A1* | 7/2016 | Pitis .................. H04W 4/18 455/420 |
| 2016/0205657 A1 | 7/2016 | Rao et al. |
| 2016/0269852 A1 | 9/2016 | Meyers et al. |

FOREIGN PATENT DOCUMENTS

| | | |
|---|---|---|
| KR | 1020030020315 | 3/2003 |
| KR | 1020150140021 | 12/2015 |
| KR | 10-2016-0037523 | 4/2016 |

OTHER PUBLICATIONS

U.S. Appl. No. 14/869,900, Location Determination Using a Companion Device, filed Sep. 29, 2015, of 30 pages.

Invitation to Pay Additional Fees in International Application No. PCTAJS2016/034313, dated Aug. 29, 2016, 8 pages.

International Search Report and Written Opinion of the International Application No. PCT/US2016/034313, dated Nov. 29, 2016, 22 pages.

* cited by examiner

/ # LOCATION SOURCE CONTROL

CROSS-REFERENCE TO RELATED APPLICATION

This application claims priority to U.S. Provisional Application No. 62/348,794, filed Jun. 10, 2016, the entire contents of which is incorporated herein by reference.

TECHNICAL FIELD

This disclosure relates generally to location determination.

BACKGROUND

Some wireless devices can be wirelessly connected with one another. The process of establishing a wireless connection can be referred to as pairing. When the two devices are located within range of direct wireless communication with one another, the two devices can automatically connect. Paired devices can submit information to and receive information from one another. Pairing can involve a wireless handshaking process, where for example, a first device broadcasts a signal, a second device detects the signal and responds by attempting to establish a wireless connection with the first device. The first device and second device then authenticate each other. The two devices are connected upon successful authentication.

SUMMARY

Techniques for location source control for paired devices are described. Location source control, also referred to as location sourcing, can include selecting a device from multiple location-aware computing devices for providing a location estimate. A mobile device can receive, from an application program, a request for determining a location of the mobile device. The mobile device can determine a first location estimate using a location subsystem of the mobile device. The mobile device can determine whether to provide the first location estimate as input to the application program, or to provide a second location estimate as input to the application program. The second location estimate can be an estimated location of a companion device and determined by the companion device.

The features described in this specification can be implemented to achieve various advantages. For example, compared to conventional location determination, the techniques described in this specification provide more flexibility. Conventionally, if a device receives a request for location but is incapable of providing the location as requested, the device may respond by indicating a failure. Using the technology described herein, the device can attempt to obtain the location by requesting help from a paired companion device. A request for help can be made in the background, without user intervention. Accordingly, the device can produce fewer apparent failures, and provide a better user experience.

In various circumstances, such as when the mobile device is being worn on a wrist that moves back and forth and when the companion device is being carried in a pocket, a location estimate of the companion device may be a more accurate than the location estimate of the mobile device. Accordingly, providing the location estimate of the companion device as an input to the application program may be a better option than providing the location estimate of the mobile device as an input to the application program, if the application program requires a precise location.

In various circumstances, the mobile device may be a wearable device having a small battery, where a companion device may be a smartphone or tablet computer having a comparatively larger battery. Outsourcing location estimation from the wearable device to the smartphone or tablet computer may conserve power for the wearable device.

The techniques described in this specification improves upon conventional location technology. In particular, instead of using a location system on a single device, the techniques described in this specification allow a mobile device to outsource location determination to multiple devices, even if the mobile device does not have a wired connection to the other device. Accordingly, more devices can participate in location estimation, increasing redundancy. The mobile device has more options in selecting location sources, improving flexibility. The added redundancy and flexibility increases reliability and accuracy of location estimation over conventional location estimation.

The details of one or more implementations of the techniques are set forth in the accompanying drawings and the description below. Other features, aspects and advantages of the location source control techniques will become apparent from the description, the drawings and the claims.

BRIEF DESCRIPTION OF THE DRAWINGS

Like reference symbols in the various drawings indicate like elements.

DETAILED DESCRIPTION

Example Location Source Control

Figure 1:
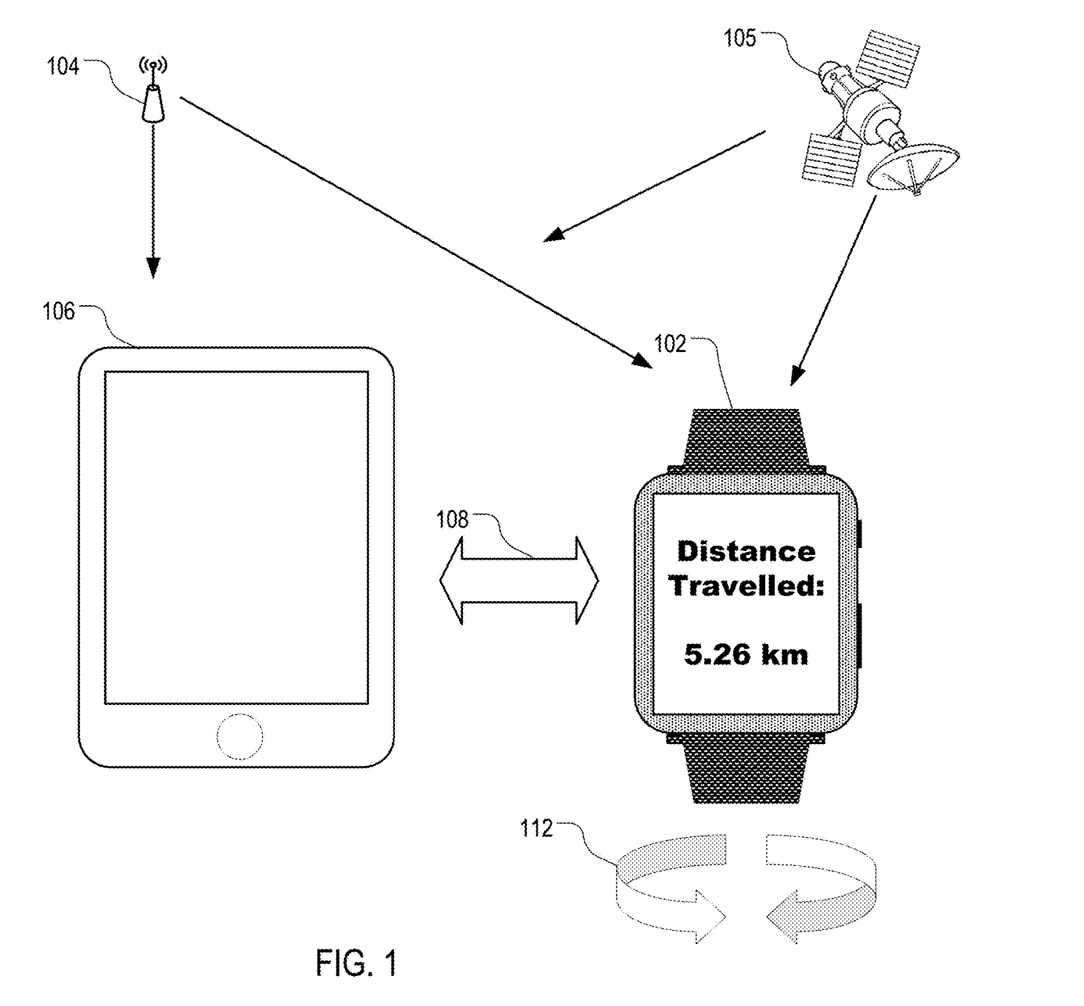
FIG. 1 is a diagram illustrating example techniques of location source control.

FIG. 1 is a diagram illustrating example techniques of location source control. Mobile device 102 can be a computing device that can pair up with a companion device. For example, mobile device 102 can be a wearable electronic device, e.g., a smartwatch. Mobile device 102 can execute one or more application programs. An application program can be configured to provide various location-related information to a user. For example, a fitness or navigation application can display distance traveled, elevation change, average speed and maximum speed.

To provide the location-related information, the application program can request a location estimate of mobile device 102. For example, a traffic warning application program may request a current location of mobile device 102 for use as a starting point for a route to a destination. The application program can send the request to a location subsystem of mobile device 102.

The location subsystem of mobile device 102 can determine the location of mobile device 102 using various technologies. For example, the location subsystem can determine the location using wireless signals from one or more signal sources 104. Signal sources 104 can be wireless beacons (e.g., access points of a wireless local area network (WLAN) or beacons of a personal area network based on Bluetooth™ architecture). The location subsystem can include a wireless processor for detecting the wireless signals, a location database that stores locations of signal sources, and a location calculation module for estimating the location of mobile device 102.

In some implementations, the location subsystem can determine the location using signals from satellites 105. The location subsystem can include a global navigation satellite system (GNSS) processor configured to process signals from satellites 105 and determine a location of mobile device 102 using the signals from satellites 105.

Mobile device 102 may pair up with companion device 106. Companion device 106 can be an electronic device (e.g., a smartphone, a tablet computing device or another wearable device) that is located in the vicinity of mobile device 102 and has established a connection with mobile device 102. Companion device 106 is located in the vicinity of mobile device 102 if companion device 106 is located within range of mobile device 102 for communicating using a short-range communication technology. The short-range communication technology (e.g., Bluetooth™, Bluetooth Low Energy (BTLE) or other wireless technology) can vary between implementations. The short range (e.g., 10 meters or less) is a range that is shorter than a range of a typical access point in a WLAN. For example, companion device 106 is located in the vicinity of mobile device 102 if both mobile device 102 and companion device 106 are on body of a same user, e.g., when the user wears mobile device 102 on wrist and holds companion device 106 in hand or carries companion device 106 in a pocket or a backpack.

Companion device 106 is paired with mobile device 102 after companion data link connection 108 has been established between mobile device 102 and companion device 106. Companion data link connection 108 can be a short-range wireless connection. Either mobile device 102 or companion device 106 may initiate establishing companion data link connection 108.

Companion device 106 can be configured to determine a location estimate of companion device 106 using various technologies. For example, companion device 106 can determine a location estimate using signal sources 104, satellites 105 or both. When companion device 106 is located in the vicinity of mobile device 102, the location of companion device 106 can be designated as the location of mobile device 102. Accordingly, mobile device 102 may use a location estimate of companion device 106 as a location estimate to provide to an application program. Accordingly, mobile device 102 can perform a location estimate using the location capabilities of companion device 106.

Estimating a location of mobile device 102 using companion device 106 may have various advantages. In cases where companion device 106 has a battery that has higher capacity than the battery of mobile device 102 (e.g., when mobile device 102 is a smartwatch and companion device 106 is a tablet computer having a larger battery), percentage-wise, location estimation using companion device 106 uses less power than location estimation using mobile device 102. In some cases, companion device 106 may have a more accurate location estimate than mobile device 102. For example, when mobile device 102 is worn on a wrist of a jogger and companion device 106 is carried in a backpack of the jogger, mobile device 102 may experience more angular acceleration 112 than companion device 106, resulting in higher interference and lower accuracy in location determination.

Mobile device 102 can determine, based on a location context of mobile device 102 and one or more location sourcing rules, whether to use a location estimate (referred to as a first location estimate or native location estimate) provided by the location subsystem of mobile device 102 or a location estimate (referred to as a second location estimate or companion location estimate) provided by a location subsystem of companion device 106. The location context can include various states of mobile device 102, including, for example, an accuracy requirement of the application program using the location estimate as input, a type of the application program, sensor readings and battery power management tool inputs. The location sourcing rules specifies which location estimate to select under what circumstances. Additional details on location sourcing rules are described below in reference to FIG. 4.

Upon selecting the first location estimate, mobile device 102 can activate at least a portion of the location subsystem if that portion of the location subsystem has not been active already. Upon selecting the second location estimate, mobile device 102 can submit a location request and receive the second location estimate through companion data link connection 108. Companion data link connection 108 can be established prior to the location request; alternatively, establishing companion data link connection 108 can be triggered by the location request.

Mobile device 102 can submit the location request, including an accuracy specification, to companion device 106 through companion data link connection 108. In response, companion device 106 can provide the second location estimate to mobile device 102. In some implementations, companion device 106 can provide additional information regarding the second location estimate to mobile device 102. The additional information can indicate reliability, accuracy level, or both, of the second location estimate. The additional information can include a location context of companion device 106. Mobile device 102 then has another opportunity to determine, based on the additional information, whether to select the first location estimate or second location estimate.

Example Applications of Location Source Control

Figure 2A:
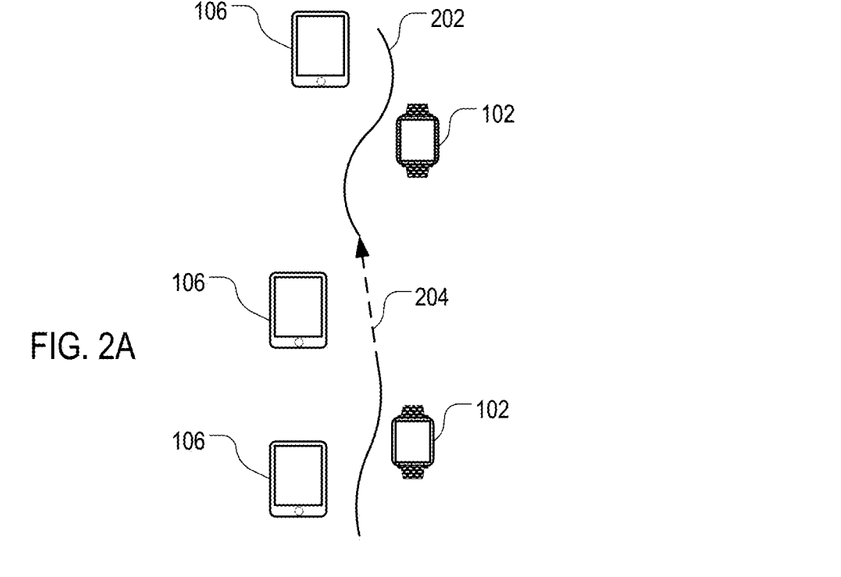
FIGS. 2A and 2B are diagrams illustrating example implementations of location source control.
Figure 2B:
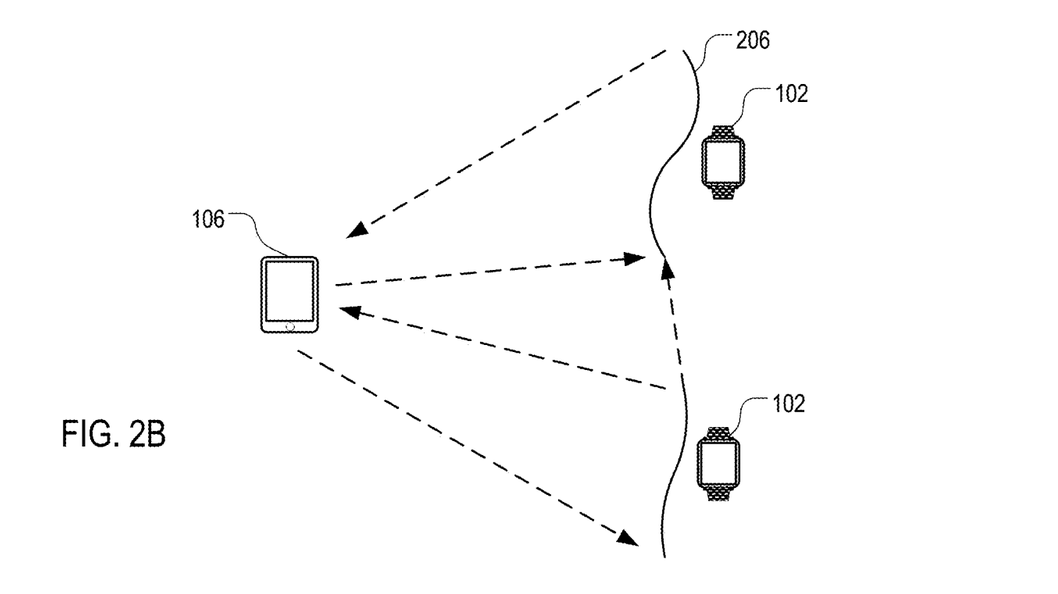

FIGS. 2A and 2B are diagrams illustrating example implementations of location source control. FIG. 2A illustrates a scenario where mobile device 102 and companion device 106 move in synchronization. In the example, mobile device 102 is a wearable device, e.g., a smartwatch, that is worn on a wrist of a user. Companion device 106 is device carried on the user or near the user (e.g., in a same car or plane) while the user travels along path 202. Mobile device 102 can execute an application program (e.g., a fitness program or a navigation program) that uses a location estimate as an input. Mobile device 102 includes a location subsystem (e.g., a GNSS processor) for determining a location estimate. In the example, mobile device 102 is paired with companion device 106.

Mobile device 102 can determine, using a location context and location sourcing rules, whether to use a first location estimate or a second location estimate as input to the application program. As described earlier, the first location estimate is a native location estimate determined by a location subsystem of mobile device 102. The second location estimate is a companion location estimate determined by a location subsystem of companion device 106. Mobile device 102 can determine a motion mode that represents a mode of movement of mobile device 102. For example, mobile device 102 can determine, based on accelerometer and magnetometer readings and optionally, location subsystem output, whether mobile device 102 is stationary or is moving in a smooth moving mode. The smooth moving mode can correspond to a motion mode where motion sensor readings indicate that mobile device 102 is moving and the movement lacks periodic acceleration and deceleration associated with activity types such as walking, jogging, rowing or swimming.

Mobile device 102 can determine an activity type based on the motion mode and speed of motion. The activity type can indicate a user activity that may affect the native location estimate. For example, based on absence of periodic acceleration and deceleration and depending on speed of motion, mobile device 102 can determine one or more activity types including biking, driving or flying.

Mobile device 102 can be associated with an activity type. Mobile device 102 and companion device 106 can move in synchronization if mobile device 102 and companion device 106 share a same activity type, or be associated with respective activity types that correspond to a same motion mode.

Mobile device 102 can request location estimate from companion device 106. The request can be associated with an accuracy requirement. Upon receiving the companion location estimate from companion device 106, mobile device 102 can confirm that the activity type matches an activity type of companion device 106 and that the accuracy requirement is met.

Upon confirmation, mobile device 102 can provide the received location estimate to the application program as input. In addition, upon confirmation, mobile device 102 can determine whether a location subsystem (e.g., a GNSS processor or a Wi-Fi location subsystem) of mobile device 102 was active before receiving the companion location estimate. If yes, mobile device 102 can turn off the location subsystem.

If mobile device 102 is unable to make the confirmation, and the location subsystem was inactive before receiving the location estimate, mobile device 102 can turn on the location subsystem. In addition, during motion of mobile device 102, e.g., at a portion 204 of path 202 marked in dashed lines, if mobile device 102 loses pairing with companion device 106, mobile device 102 can activate the location subsystem of mobile device 102 to obtain a native location estimate. The local subsystem can be active for the duration that mobile device 102 is not paired with companion device 106 (e.g., when a connection is interrupted).

FIG. 2B illustrates a scenario where mobile device 102 and companion device 106 do not share a same activity type. In some situations, e.g., when user wearing mobile device 102 jogs around a location, and companion device 106 can be located in a backpack placed at the location, motions of mobile device 102 and companion device 106 may be different (e.g., mobile device 102 is moving and companion device 106 is stationary). For example, mobile device 102 can move along path 206. Along path 206, mobile device 102 can communicate with companion device 106, which is stationary. In such cases, simply designating the companion location provided by companion device 106 may result in an inaccurate location estimate. Accordingly, in such cases, mobile device 102 can avoid the inaccuracy by using the native location estimate rather than the companion location estimate.

Mobile device 102 can determine, based on accelerometer and magnetometer readings and optionally, a location subsystem output, that mobile device 102 is associated with a first activity type, also referred to as a native activity type. The first activity type can correspond to a motion mode where motion sensor readings indicate that mobile device 102 is moving and the movement includes, for example, periodic acceleration and deceleration, back-and-forth movements, or both, that are associated with activities such as walking, jogging, rowing, or swimming. Mobile device 102 can determine a second activity type, also referred as a companion activity type, that is associated with companion device 106 using information provided from companion device 106. Mobile device 102 can determine the companion activity type by requesting a companion location estimate from companion device 106.

Upon determining the first activity type and the second activity type, mobile device 102 can determine whether mobile device 102 and companion device 106 share a same activity type. For example, mobile device 102 can determine that the first activity type is jogging, and the second activity type is resting. Accordingly, mobile device 102 can determine that mobile device 102 and companion device 106 do not share a same activity type. As a result, mobile device 102 can determine not to use a companion location estimate from companion device 106 as a location estimate of mobile device 102.

Example Devices

Figure 3:
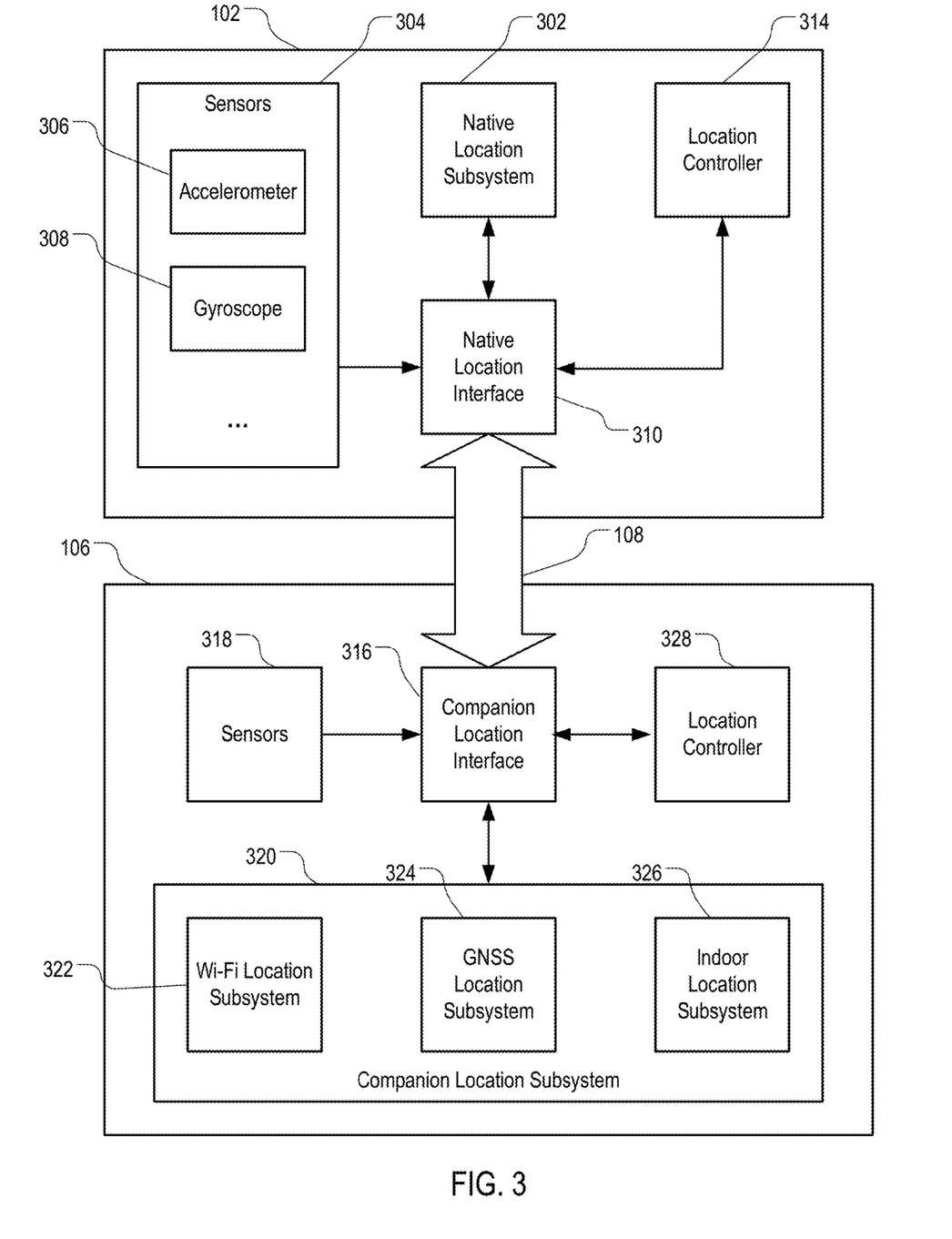
FIG. 3 is a block diagram illustrating components of example devices implementing location source control techniques.

FIG. 3 is a block diagram illustrating components of example devices implementing location source control techniques. The devices can include mobile device 102 and companion device 106. Each of mobile device 102 and companion device 106 can be a computing device that is improved over a conventional computing device. Some improvements include, for example, while a conventional location-aware computing device may fail to estimate a location when battery power is low, mobile device 102 can obtain the location from companion device 106. For another example, location estimation accuracy in a conventional location-aware computing device may be affected by movement of the device, mobile device 102 can choose to obtain the location estimate from companion device 106 that is not affected or affected less by the movement. Accordingly, compared to a conventional computing device, mobile device 102 can have a more reliable and more accurate location estimate.

Mobile device 102 can include a location subsystem as described earlier. The location subsystem can be designated as native location subsystem 302. Native location subsystem 302 is a component of mobile device 102 configured to provide a native location estimate. Native location subsystem 302 can include a GNSS processor including a GNSS receiver (e.g., a global positioning system (GPS) receiver or a GLONASS receiver). Native location subsystem 302 can include a Wi-Fi location subsystem configured to determine a location from wireless local area network (WLAN) access point signals. Native location subsystem 302 can include an inertial navigation system configured to determine a location using, for example, dead reckoning, a magnetometer, a motion sensor or combination of the above. Native location subsystem 302 can include a cell positioning system configured to determine a location using cellular signals. Native location subsystem 302 can determine a native location accuracy level, e.g., error in meters. Native location subsystem 302 can determine the native location accuracy level based on, for example, number of detectable GNSS satellites, GNSS signal strength, Wi-Fi signal strength, among other factors.

Mobile device 102 can include one or more sensors 304. Sensors 304 can provide readings that can be used to determine a location context of mobile device. The location context can include information for determining whether to use a native location estimate or companion location estimate. The sensor readings can include output from motion sensors, battery power level, device operating mode (e.g., whether the device is in a "normal" mode, "power saving" mode, or an "airplane" mode where some radio functions are turned off), or various combinations of the above. The sensor readings can include reading from accelerometer 306 for measuring linear acceleration, gyroscope 308 for measuring angular motion and acceleration, and magnetometer for measuring direction and intensity of magnetic fields, among other sensors.

Mobile device 102 can include a location interface designated as native location interface 310. Native location interface 310 is a component of mobile device 102 configured to determine whether to request companion location estimates from companion device 106. If yes, companion device 106 can provide the companion location estimates through various data transfer techniques, e.g., by streaming.

In some implementations, native location interface 310 can determine whether to obtain companion location estimates from companion device 106 based on battery level. Upon determining that the battery level on mobile device 102 is below a first threshold level and optionally, that battery level on the companion device is above a second threshold level, native location interface 310 can turn off at least a portion of native location subsystem 302 (e.g., a GNSS receiver). Native location interface 310 can then obtain (e.g., by streaming) information including companion location estimates from a companion data link connection (e.g. a BTLE-type connection).

In some implementations, native location interface 310 can determine whether to obtain companion location estimates based on activity type. For example, native location interface 310 can determine that a group of one or more activity types associated with repetitive motion or acceleration has reached a threshold amount to cause interference with GNSS location determination. In response, native location interface 310 can determine to outsource location determination to companion device 106 by requesting companion location estimates from companion device 106 rather than using native location subsystem 302.

During the acquisition of companion location estimates, native location interface 310 can provide a requested accuracy level. The requested accuracy level can include an error margin provided by native location subsystem 302, or a maximum allowable error margin requested by an application program that uses the location estimate as input. The requested accuracy level can indicate to companion device 106 that companion device 106 should provide a companion location estimate that has a better (e.g., smaller) error margin.

Mobile device 102 can include location controller 314. Location controller 314 is a component of mobile device 102 configured to provide another opportunity to decide whether to use the native location estimate or the companion location estimate received by location interface 310 as input to an application program that requests location input. Location controller 314 can determine whether to turn off at least a portion of native location subsystem 302. For example, location controller 314 can determine that the estimated accuracy level is better (e.g., an error margin that is at least X percent smaller) on companion device 106 by comparing the error margin provided by native location subsystem 302 with an error margin provided by companion device 106. Upon the determination, location controller 314 can turn off native location subsystem 302 (e.g., by powering down a GNSS processor) and provide the companion location estimate obtained from companion data link connection 108 to the requesting application program.

Likewise, location controller 314 can determine that the estimated accuracy level is worse (e.g., having an error margin that is at least Y percent larger) on companion device 106. Upon the determination, location controller 314 can turn on native location subsystem 302 (e.g., by powering up a GNSS processor) and provide the native location estimate to the requesting application program. Additional details on the operations of location controller 314 are described below in reference to FIG. 4.

Companion device 106 can include a location interface designated as companion location interface 316. Companion location interface 316 is a component of companion device 106 configured to receive location requests from native location interface 310 through companion data link connection 108. Companion location interface 316 can provide companion location estimate to native location interface 310 in response.

Companion device 106 can include sensors 318. Like sensors 304 providing a location context for mobile device 102, sensors 318 can provide a location context for companion device 106. The location context can include operating modes, motion modes, activity types and battery levels, for example. Companion device 106 can provide the location context to mobile device 102 in association with the companion location estimate. In some implementations, companion device 106 can provide the location context to mobile device 102 as standalone information, without including the companion location estimate. For example, when sensor 318 indicates that the battery level of companion device 106 drops below a threshold level, companion location interface 316 can refuse the request for a companion location estimate. Companion location interface 316 can then respond to the request by providing a location context of companion device 106, notifying mobile device 102 that no companion location estimate is available, and the reason that no location estimate is available (e.g., the battery level is low).

Companion device 106 can include companion location subsystem 320. Companion location subsystem 320 can include one or more components, for example, Wi-Fi location subsystem 322, GNSS location subsystem 324, indoor location subsystem 326 (for determining an indoor location). Due to more relaxed size restrictions on companion device 106 compared to those of mobile device 102, companion location subsystem 320 can be more accurate or power efficient than native location subsystem 302.

Companion device 106 can include location controller 328. Location controller 328 is a component of companion device 106 configured to perform operations similar to those of location controller 314 of mobile device 102. In some implementations, the roles of mobile device 102 and companion device 106 may be reversed, where companion device 106 outsources a location request. For example, a fitness program executing on companion device 106 (carried in a pocket) may request information on determining arm movements during skiing. The arm movement as observed by mobile device 102 may be more accurate, if mobile device 102 is worn on a wrist. Location controller 328 can be configured to outsource motion sensor readings and location estimates to mobile device 102 that is worn on a wrist. Location controller 328 can determine whether to use a location estimate determined by companion location subsystem 320 or by native location subsystem 302 as input to the fitness program, based on how accurate each location estimate is.

Figure 4:
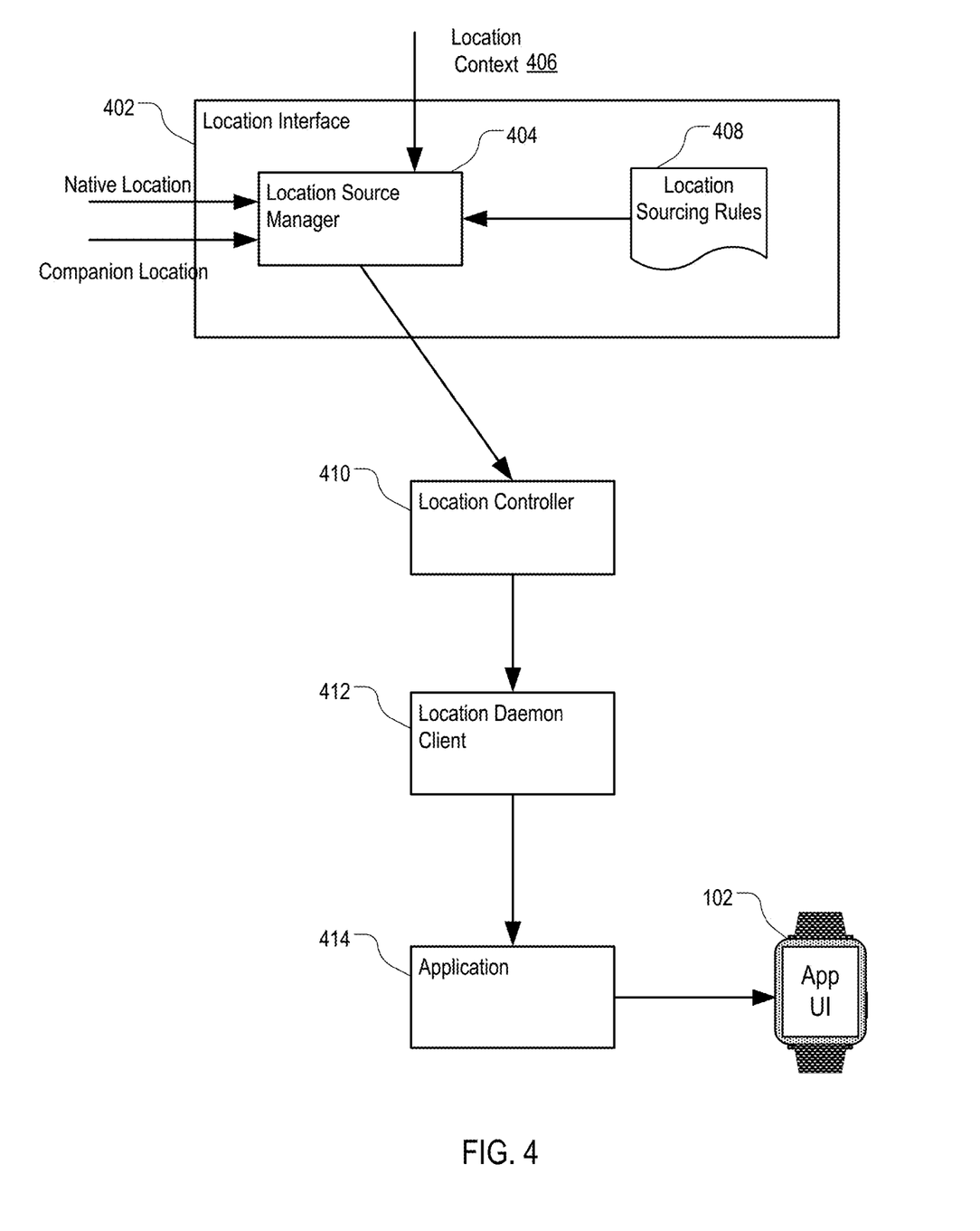
FIG. 4 is a block diagram illustrating operations of an example location interface.

FIG. 4 is a block diagram illustrating operations of an example location interface 402. Location interface 402 can be native location interface 310 of FIG. 3 or companion location interface 310 of FIG. 3. For convenience, location interface 402 is described in reference to native location interface 310.

Location interface 402 can include location source manager 404. Location source manager 404 is a component of location interface 402 configured to receive location estimates from different sources, and determine which location estimate to provide to an application program. The determination can be based on location context 406 and location sourcing rules 408. Location context 406 can include respective battery levels of both the mobile device and its companion device. Location context 406 can include sensor readings from sensors on the mobile device and sensors on companion device. Location sourcing rules 408 can specify which pattern of sensor readings corresponds to which activity type. Location source manager 404 can then determine respective activity types (e.g., walking, stationary or driving) for both the mobile device and its companion device.

Location sourcing rules 408 can include a data structure (e.g., one or more tables or matrices) specifying that, for example, when activity types of the mobile device and its companion device match, a companion location estimate is used as a location source; when the activity type of the mobile device and its companion device do not match, a native location estimate is used as a location source. Location source manager 404 can make a corresponding selection of a location estimate based on these rules. Location source manager 404 can provide a selected location estimate to location controller 410.

In addition, in some implementations, location sourcing rules 408 can specify which activity types are compatible with one another, where, if a mobile device is associated with an activity type A (e.g., jogging) and a companion device is associated with an activity type B (e.g., walking), the mobile device can still use the companion location estimates from the companion device even if A and B do not have an exact match. These implementations relax the matching requirement to accommodate differences in determined activity types due to devices being placed close together at different places of a vehicle or a human body.

The location estimates received by location source manager 404 can include respective accuracy levels. Location source manager 404 or location controller 410 can compare the accuracy levels to select a location estimate that is more accurate. Location source manager 404 or location controller 410 can turn off a navigation component on the mobile device or on its companion device that has lower accuracy level.

Location controller 410 can be location controller 314 of mobile device 102 or location controller 328 of companion device 106, as described in reference to FIG. 3. In addition to the operations already described, location controller 410 can determine which location technology (e.g., GNSS, Wi-Fi, inertial) to use based on device settings. For example, in "airplane mode," location controller 410 can turn off both GNSS and Wi-Fi location subsystems. Location controller 410 can provide the selected location estimate to location daemon client 412. Location daemon client 412 is a component of a device configured to listen to location controller 410 for location updates. The location updates can include new location estimates that are determined periodically, e.g., every X seconds. Location daemon client 412 can then provide the location updates to application program 414, which can provide a location-based service (e.g., a map for navigation, or a recommendation of a nearby business) on a user interface on mobile device 102.

Example Procedures

Figure 5:
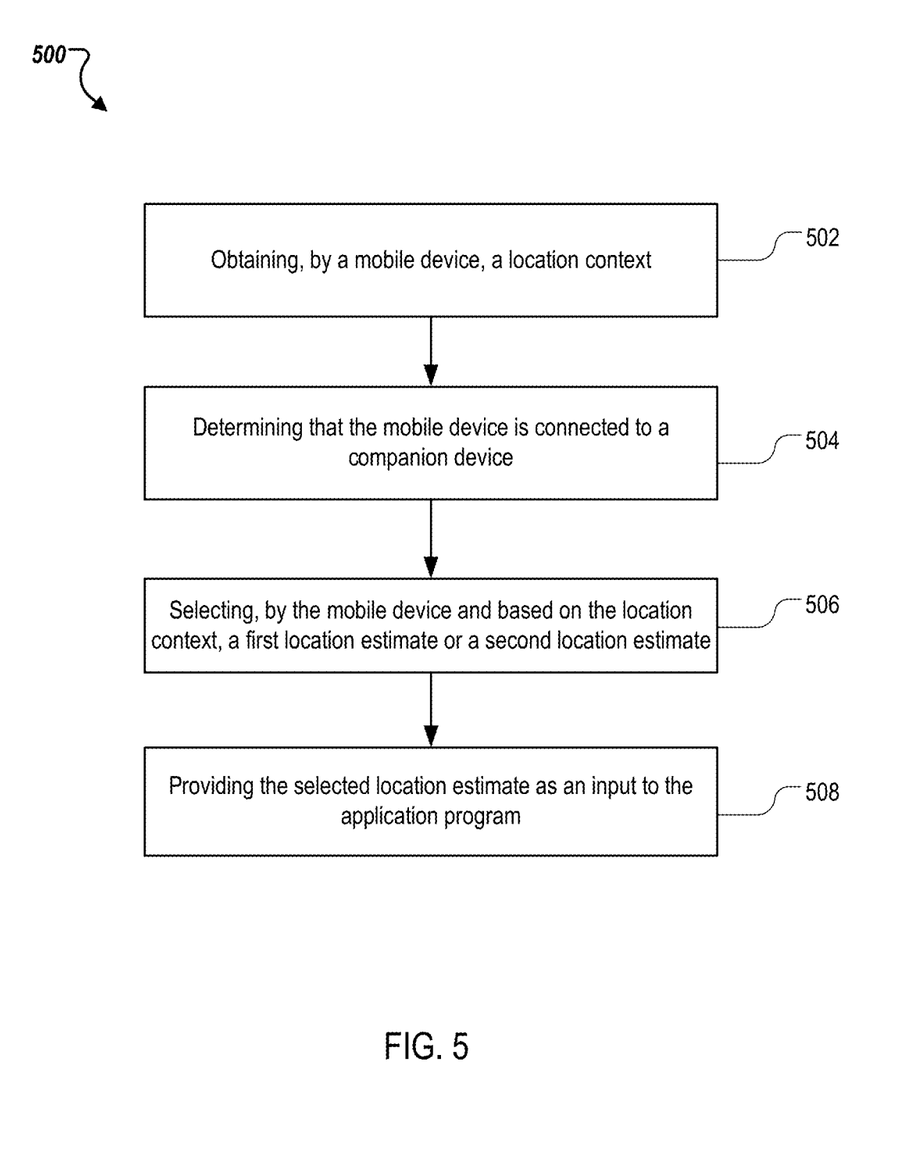
FIG. 5 is a flowchart of an example process of location source control using data from a companion device.

FIG. 5 is a flowchart of example process 500 of location source control using data from a companion device. Process 500 can be performed by mobile device 102 and companion device 106.

Mobile device 102 can receive, from an application program executing on mobile device 102, a request for location of mobile device 102. Mobile device 102 can obtain (502) a location context that is derived from sensor data provided by a sensor of mobile device 102. The sensor can be a motion sensor (e.g., an accelerometer, gyroscope or pedometer). The location context can include an activity type. In some implementations, the location context includes a reading of the motion sensor indicating whether a motion of the mobile device may interfere with operations of the location subsystem. For example, a repeated acceleration pattern can indicate that mobile device 102 (being worn on a wrist) is in a jogging mode, and that the acceleration may affect velocity calculation in determining a position, velocity and time (PVT) solution by a GNSS processor.

Mobile device 102 can determine (504) that mobile device 102 is connected to a companion device (e.g., companion device 106). For example, mobile device 102 can determine that mobile device 102 is connected to another device through a Bluetooth-based connection, and that the other device is designated as a companion device of mobile device 102 by a MAC address in a record in a user account. Mobile device 102 can receive a sensor reading of the companion device from the companion device through the Bluetooth-based connection between the mobile device and the companion device Mobile device 102 can select (506) a first location estimate or a second location estimate based on the location context. The first location can be estimated by a location subsystem of mobile device 102. The second location can be estimated by the companion device connected to mobile device 102. Mobile device 102 can receive the second location estimate through the Bluetooth-based connection between the mobile device and the companion device.

Selecting the first location estimate or the second location estimate can include selecting the second location estimate upon determining that the motion of mobile device 102 (e.g., back-and-force movement or periodic acceleration) may interfere with operations of the location subsystem. Selecting the first location estimate or the second location estimate can include selecting the first location estimate upon determining that the motion of mobile device 102 does not interfere with operations of the location subsystem.

Selecting the first location estimate or the second location estimate can further be based on a sensor reading of the companion device. Mobile device 102 can select the first location estimate upon determining that the sensor reading of companion device 106 indicates that companion device 106 is not moving in synchronization with mobile device 102. Mobile device 102 can select the second location estimate upon determining that the sensor reading of companion device 106 indicates that companion device 106 is moving in synchronization with mobile device 102. Determining whether companion device 106 is or is not moving in synchronization with mobile device 102 can include determining whether respective activity types associated with companion device 106 and with mobile device 102 match or belong to a same category as specified in one or more location sourcing rules. For example, mobile device 102 can determine that two activity types match upon determining that the two activity types are the same (e.g., "jogging"). Mobile device 102 can determine that two activity types are in a same category upon determining that the two activity types are different (e.g., "walking" and "jogging") but are in a same category (e.g., "aerobic fitness") that includes similar activities (e.g., "hiking," "jogging" and "walking").

In some implementations, mobile device 102 receives the second location estimate through a location interface of mobile device 102. The location interface is configured to select the first location estimate or the second location estimate. The location interface can make the selection by applying a location sourcing rule to the location context. The location sourcing rule can specify conditions for selecting the first location estimate or the second location estimate, as described in reference to FIG. 4. The conditions can include whether the location context indicates whether a user of the mobile device is engaging in one or more types of activity. The conditions further include whether the location context satisfies a location accuracy level requirement specified by the application program.

Mobile device 102 can provide (508) the selected location estimate as an input to the application program. Providing the selected location estimate as an input to the application program can be through a location daemon client. The application program can then present location-based information in a user interface. In some implementations, mobile device 102 can turn on or turn off one or more location functions of mobile device 102 based on the selection. For example, mobile device 102 can turn off a GNSS module upon selecting the second location estimate.

Example Mobile Device Architecture

Figure 6:
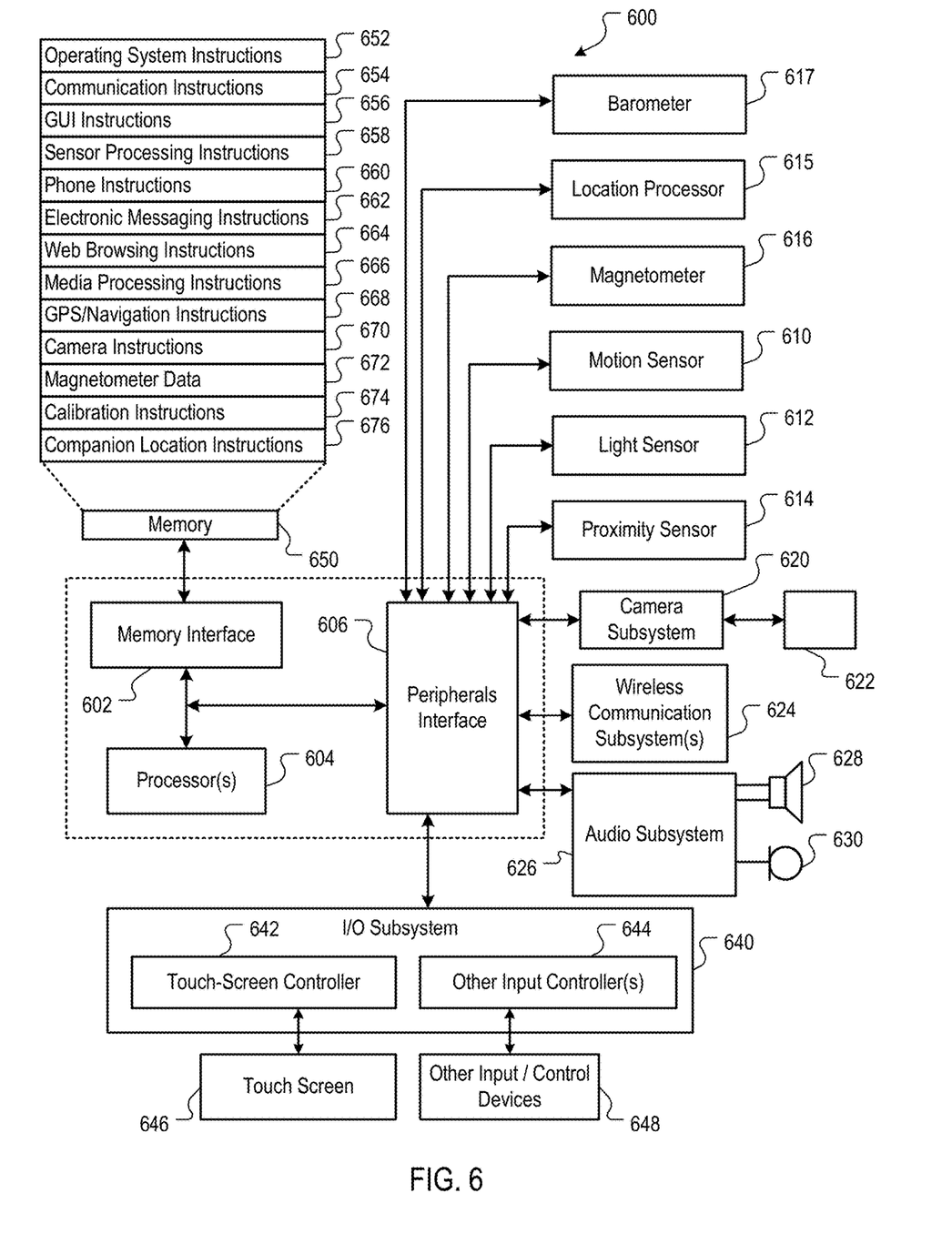
FIG. 6 is a block diagram illustrating an example device architecture of a mobile device implementing the features and operations described in reference to FIGS. 1-5.

FIG. 6 is a block diagram of an example architecture 600 for a mobile device. A mobile device (e.g., mobile device 102 or companion device 106) can include memory interface 602, one or more data processors, image processors and/or processors 604, and peripherals interface 606. Memory interface 602, one or more processors 604 and/or peripherals interface 606 can be separate components or can be integrated in one or more integrated circuits. Processors 604 can include application processors, baseband processors, and wireless processors. The various components in the mobile device, for example, can be coupled by one or more communication buses or signal lines.

Sensors, devices and subsystems can be coupled to peripherals interface 606 to facilitate multiple functionalities. For example, motion sensor 610, light sensor 612 and proximity sensor 614 can be coupled to peripherals interface 606 to facilitate orientation, lighting and proximity functions of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Motion sensor 610 can include one or more accelerometers configured to determine change of speed and direction of movement of the mobile device. Barometer 617 can include one or more devices connected to peripherals interface 606 and configured to measure pressure of atmosphere around the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi™ or WiMax™ network and a Bluetooth™ network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording, and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646. Touch surface 646 can include, for example, a touch screen.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of the touch surface 646; and a pressing of the button for a second duration that is longer than the first duration may turn power to the mobile device on or off. The user may be able to customize a functionality of one or more of the buttons. The touch surface 646 can, for example, also be used to implement virtual or soft buttons and/or a keyboard.

In some implementations, the mobile device 102 can present recorded audio and/or video files, such as MP3, AAC, and MPEG files. In some implementations, the mobile device can include the functionality of an MP3 player. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions, and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can store companion location instructions 676 that, when executed, can cause processor 604 to perform operations of example process 500 as described above in reference to FIG. 5.

Each of the above identified instructions and applications can correspond to a set of instructions for performing one or more functions described above. These instructions need not be implemented as separate software programs, procedures or modules. Memory 650 can include additional instructions or fewer instructions. Furthermore, various functions of the mobile device may be implemented in hardware and/or in software, including in one or more signal processing and/or application specific integrated circuits.

Example Operating Environment

Figure 7:
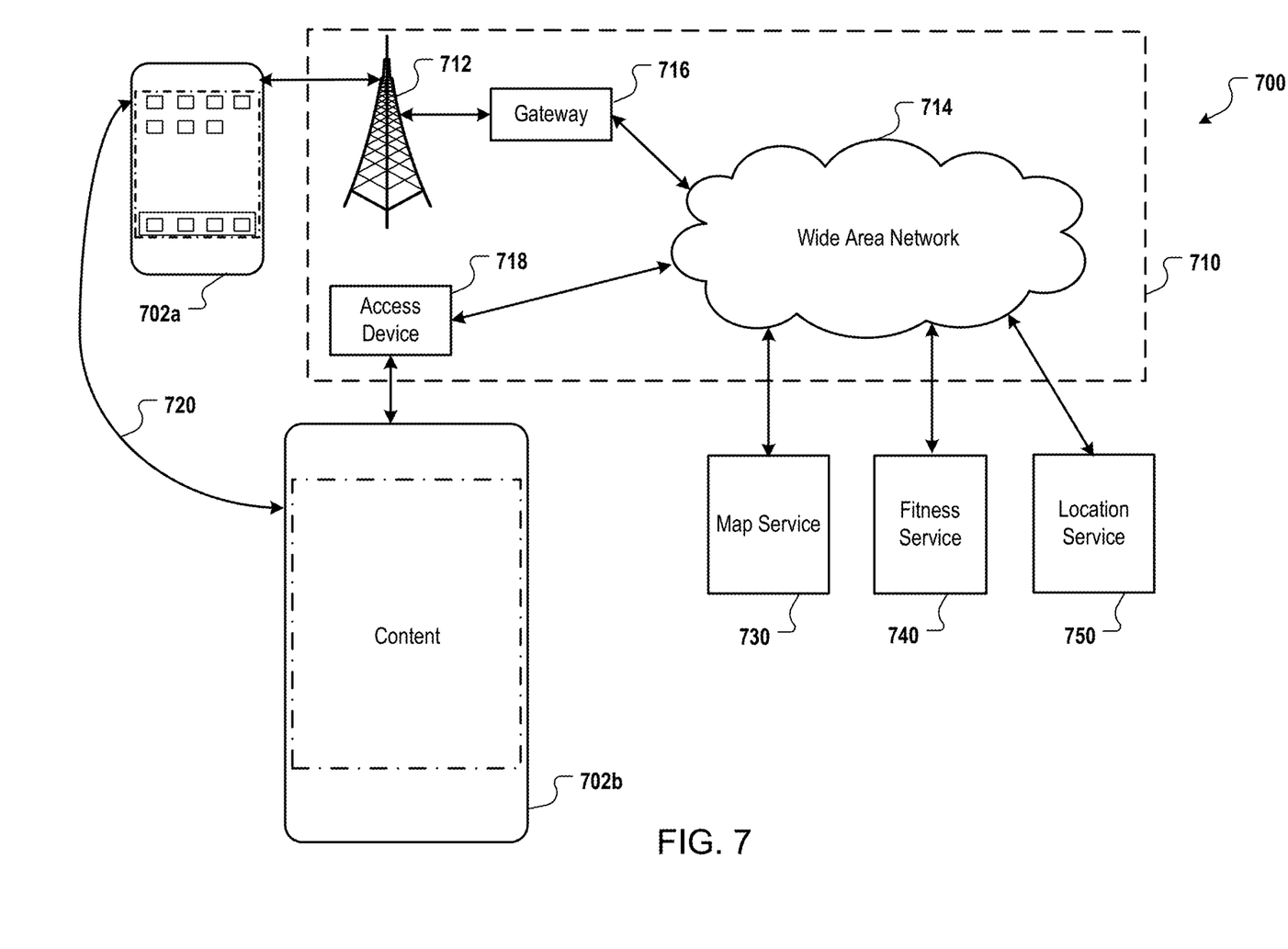
FIG. 7 is a block diagram of an example network operating environment for the mobile devices of FIGS. 1-6.

FIG. 7 is a block diagram of an example network operating environment 700 for the mobile devices of FIGS. 1-6. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access point, can provide communication access to the wide area network 714. Each of mobile devices 702a and 702b can be mobile device 102 or companion device 106.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless device 702a can communicate with other wireless devices, e.g., other mobile devices, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

The mobile device 702a or 702b can, for example, communicate with one or more services 730, 740, and 750 over the one or more wired and/or wireless networks. For example, one or more map services 730 can provide map information to mobile devices 702a and 702b for display in a navigation application. Fitness service 740 can provide one or more applications for download to mobile devices 702a and 702b and for specifying activity types. Location service 750 can include providing crowd-sourced data including locations of wireless access points to mobile devices 702a and 702b.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:
1. A method comprising:
receiving, by a wearable device, a location request from an application program executing on the wearable device, the location request requesting a location of the wearable device;
obtaining, by the wearable device, a location context derived from sensor data provided by a sensor of the wearable device;
sending, by the wearable device, a location estimate request to a companion device, the location estimate request including a request for a location accuracy for a location estimate determined in response to the location estimate request;

receiving, by the wearable device from the companion device, a second location estimate and the location accuracy for the second location estimate;

determining, by the wearable device, whether the companion device is moving in synchronization with the wearable device;

selecting, by the wearable device, a first location estimate determined by the wearable device or the second location estimate, the selecting based on the location accuracy, the location context, and determination whether the companion device is moving in synchronization with the wearable device; and upon selecting the first location estimate or the second location estimate, providing, by the wearable device, the selected location estimate to the application program in response to the location request, wherein selecting the first location estimate or the second location estimate comprises:

selecting the first location estimate upon determining that a comparison of sensor readings of the wearable device and the companion device indicates that the companion device is not moving in synchronization with the wearable device; and selecting the second location estimate upon determining that a comparison of the sensor readings of the wearable device and the companion device indicates that the companion device is moving in synchronization with the wearable device.

2. The method of claim 1, wherein determining that the comparison of the sensor readings of the wearable device and the companion device indicates that the companion device is not moving in synchronization with the wearable device comprises:

determining that the wearable device is moving based on the location context; and determining that the companion device is stationary based on the sensor reading of the companion device.

3. The method of claim 1, wherein selecting the first location estimate or the second location estimate further comprises determining, based on the location context, that motion of the wearable device may interfere with operations of a location subsystem of the wearable device, and selecting the second location estimate in response to the determining.

4. The method of claim 1, wherein selecting the first location estimate or the second location estimate further comprises selecting the second location estimate upon determining that the location context indicates that a battery level of the wearable device is below a first threshold value and that a sensor reading of the companion device indicates that a battery level of the companion device is above a second threshold value.

5. The method of claim 4, wherein the wearable device receives the sensor reading of the companion device and the second location estimate from the companion device through a Bluetooth-based connection between the wearable device and the companion device.

6. The method of claim 1, further comprising:

receiving the second location estimate by the wearable device and from the companion device through a location interface of the wearable device, the location interface configured to determine whether the wearable device should provide the first location estimate or the second location estimate to the program by applying a location sourcing rule to the location context, the location sourcing rule specifying conditions for selecting the first location estimate or the second location estimate.

7. The method of claim 6, wherein the conditions include whether the location context indicates that a user of the wearable device is engaging in one or more types of activity.

8. The method of claim 6, wherein the conditions include whether the location context satisfies a location accuracy requirement specified by the application program.

9. The method of claim 1, wherein determining whether the companion device is moving in synchronization with the wearable device comprises determining, by the wearable device, whether the wearable device and the companion device coupled to the wearable device share a same activity, and wherein the first location estimate or the second location estimate is selected further based on whether the wearable device and the companion device share the same activity.

10. The method of claim 8, comprising:

upon confirming that the location estimate satisfies the location accuracy requirement, determining if a location subsystem of the wearable device was active prior to the receiving a location estimate from the companion device; and in response, turning off the location subsystem of the wearable device.

11. A wearable device comprising:

a sensor;

one or more processors; and a location controller configured to receive, a location request from an application program executed by the wearable device, the location request requesting a location of the wearable device;

a location interface configured to obtain a location context derived from sensor data provided by the sensor of the wearable device; and a location source manager configured to:

send a location estimate request to a companion device, the location estimate request including a request for a location accuracy for a location estimate determined in response to the location estimate request;

receive, from the companion device, a second location estimate and the location accuracy for the second location estimate;

determine whether the companion device is moving in synchronization with the wearable device;

select a first location estimate determined by the wearable device or the second location estimate, the selection based on the location accuracy, the location context, and determination whether the companion device is moving in synchronization with the wearable device, wherein the first location estimate is provided by the wearable device; and upon selection of the first location estimate or the second location estimate, provide the first location estimate or the second location estimate to the application program in response to the location request, wherein to select the first location estimate or the second location estimate includes to:

select the first location estimate upon determination that a comparison of sensor readings of the wearable device and the companion device indicates that motion of the companion device is not in synchronization with the wearable device; and select the second location estimate upon determination that a comparison of the sensor readings of the wearable device and the companion device indicates that the companion device is moving in synchronization with the wearable device.

12. The wearable device of claim 11, wherein determining whether the companion device is moving in synchronization with the wearable device comprises determining whether the wearable device and the companion device coupled to the wearable device share a same activity, and wherein the first location estimate or the second location estimate is selected further based on whether the wearable device and the companion device share the same activity.

13. The wearable device of claim 11, wherein the location source manager is configured to:
  upon confirmation that the location estimate satisfies a location accuracy requirement specified by the application program, determine if a location subsystem of the wearable device was active prior to the receiving a location estimate from the companion device; and
  in response, turn off the location subsystem of the wearable device.

14. The wearable device of claim 11, wherein determination that the comparison of the sensor readings of the wearable device and the companion device indicates that motion of the companion device is not in synchronization with the wearable device includes for the one or more processors to:
  determine that the wearable device is in motion based on the location context; and
  determine that the companion device is stationary based on the sensor reading of the companion device.

15. A system comprising:
  one or more processors; and
  a non-transitory computer-readable medium storing instructions that, when executed by the one or more processors, cause the one or more processors to perform operations comprising:
    receiving a location request from an application program executing on a wearable device, the location request requesting a location of the wearable device;
    obtaining a location context derived from sensor data provided by a sensor of the wearable device;
    sending a location estimate request to a companion device, the location estimate request including a request for a location accuracy for a location estimate determined in response to the location estimate request;
    receiving, from the companion device, a second location estimate and the location accuracy for the second location estimate;
    determining whether the companion device is moving in synchronization with the wearable device;
    selecting a first location estimate determined by the wearable device or the second location estimate, the selecting based on the location accuracy, the location context, and determination whether the companion device is moving in synchronization with the wearable device; and
    upon selecting the first location estimate or the second location estimate, providing the selected location estimate to the application program in response to the location request, wherein selecting the first location estimate or the second location estimate comprises:
      selecting the first location estimate upon determining that a comparison of sensor readings of the wearable device and the companion device indicates that the companion device is not moving in synchronization with the wearable device; and
      selecting the second location estimate upon determining that a comparison of the sensor readings of the wearable device and the companion device indicates that the companion device is moving in synchronization with the wearable device.

16. The system of claim 15, wherein selecting the first location estimate or the second location estimate further comprises:
  determining, based on the location context, that motion of the wearable device may interfere with operations of a location subsystem of the wearable device, and
  selecting the second location estimate in response to the determining.

17. The system of claim 15, wherein determining that the comparison of the sensor readings of the wearable device and the companion device indicates that the companion device is not moving in synchronization with the wearable device comprises:
  determining that the wearable device is moving based on the location context; and
  determining that the companion device is stationary based on the sensor reading of the companion device.

18. The system of claim 15, wherein determining whether the companion device is moving in synchronization with the wearable device comprises determining whether the wearable device and the companion device coupled to the wearable device share a same activity, and wherein the first location estimate or the second location estimate is selected further based on whether the wearable device and the companion device share the same activity.

19. The system of claim 15, wherein the one or more processors are caused to perform operations comprising:
  upon confirming that the location estimate satisfies a location accuracy requirement specified by the application program, determining if a location subsystem of the wearable device was active prior to the receiving a location estimate from the companion device; and
  in response, turning off the location subsystem of the wearable device.

20. A non-transitory computer-readable medium storing instructions that, when executed by one or more processors, cause the one or more processors of a wearable device to perform operations comprising:
  receiving a location request from an application program executing on the wearable device, the location request requesting a location of the wearable device;
  obtaining a location context derived from sensor data provided by a sensor of the wearable device;
  sending a location estimate request to a companion device, the location estimate request including a request for a location accuracy for a location estimate determined in response to the location estimate request;
  receiving, from the companion device, a second location estimate and the location accuracy for the second location estimate;
  determining whether the companion device is moving in synchronization with the wearable device;
  selecting a first location estimate determined by the wearable device or the second location estimate, the selecting based on the location accuracy, the location context, and determination whether the companion device is moving in synchronization with the wearable device; and
  upon selecting the first location estimate or the second location estimate, providing the selected location estimate to the application program in response to the location request, wherein selecting the first location estimate or the second location estimate comprises:
- selecting the first location estimate upon determining that a comparison of sensor readings of the wearable device and the companion device indicates that the companion device is not moving in synchronization with the wearable device; and
- selecting the second location estimate upon determining that a comparison of the sensor readings of the wearable device and the companion device indicates that the companion device is moving in synchronization with the wearable device.

21. The non-transitory computer-readable medium of claim 20, wherein determining that the comparison of the sensor readings of the wearable device and the companion device indicates that the companion device is not moving in synchronization with the wearable device comprises:
- determining that the wearable device is moving based on the location context; and
- determining that the companion device is stationary based on the sensor reading of the companion device.

22. The non-transitory computer-readable medium of claim 20, further comprising selecting the second location estimate upon determining that the location context indicates that a battery level of the wearable device is below a first threshold value and that a sensor reading of the companion device indicates that a battery level of the companion device is above a second threshold value.

23. The non-transitory computer-readable medium of claim 22, wherein the wearable device receives the sensor reading of the companion device and the second location estimate from the companion device through a Bluetooth-based connection between the wearable device and the companion device.

24. The non-transitory computer-readable medium of claim 20, further comprising:
- receiving the second location estimate by the wearable device and from the companion device through a location interface of the wearable device, the location interface configured to determine whether the wearable device should provide the first location estimate or the second location estimate to the program by applying a location sourcing rule to the location context, the location sourcing rule specifying conditions for selecting the first location estimate or the second location estimate.

25. The non-transitory computer-readable medium of claim 20, wherein determining whether the companion device is moving in synchronization with the wearable device comprises determining whether the wearable device and the companion device coupled to the wearable device share a same activity, and wherein the first location estimate or the second location estimate is selected further based on whether the wearable device and the companion device share the same activity.

26. The non-transitory computer-readable medium of claim 20, wherein the one or more processors of a wearable device are caused to perform operations comprising:
- upon confirming that the location estimate satisfies a location accuracy requirement specified by the application program, determining if a location subsystem of the wearable device was active prior to the receiving a location estimate from the companion device; and
- in response, turning off the location subsystem of the wearable device.

* * * * *